US007926339B2

(12) United States Patent
Serrano Pellicer

(10) Patent No.: US 7,926,339 B2
(45) Date of Patent: Apr. 19, 2011

(54) VERTICAL WIND TUNNEL WITH VIEWING FACILITY

(75) Inventor: Miguel Angel Serrano Pellicer, Catelldefels (ES)

(73) Assignee: Voracel, S.L., Catelldefels (ES)

( * ) Notice: Subject to any disclaimer, the term of this patent is extended or adjusted under 35 U.S.C. 154(b) by 307 days.

(21) Appl. No.: 11/988,451

(22) PCT Filed: Dec. 15, 2006

(86) PCT No.: PCT/ES2006/000688
§ 371 (c)(1),
(2), (4) Date: Jan. 8, 2008

(87) PCT Pub. No.: WO2007/074186
PCT Pub. Date: Jul. 5, 2007

(65) Prior Publication Data
US 2009/0158835 A1 Jun. 25, 2009

(30) Foreign Application Priority Data
Dec. 21, 2005 (ES) .................................. 200503132

(51) Int. Cl.
*G01M 9/00* (2006.01)
(52) U.S. Cl. .......................................................... 73/147
(58) Field of Classification Search .................. None
See application file for complete search history.

(56) References Cited

U.S. PATENT DOCUMENTS

| 4,578,037 | A | 3/1986 | Macangus et al. |
| 6,083,110 | A | 7/2000 | Kitchen et al. |
| 6,315,672 | B1 * | 11/2001 | Gillot et al. ...................... 472/50 |
| 7,028,542 | B2 * | 4/2006 | Metni ............................. 73/147 |
| 7,153,136 | B2 * | 12/2006 | Hatlestad et al. ............... 434/59 |
| 7,156,744 | B2 * | 1/2007 | Metni et al. ..................... 472/50 |
| 7,524,189 | B2 * | 4/2009 | Delalande ....................... 434/59 |
| 2004/0115593 | A1 | 6/2004 | Hatlestad et al. |

FOREIGN PATENT DOCUMENTS

| FR | 2659620 | 9/1991 |
| JP | 08-182787 | 7/1996 |
| JP | 11-042308 | 2/1999 |

* cited by examiner

Primary Examiner — Lisa M Caputo
Assistant Examiner — Jermaine Jenkins
(74) Attorney, Agent, or Firm — Dowell & Dowell, P.C.

(57) ABSTRACT

The invention is directed to a wind tunnel designed to operate along a vertical section such that air currents, generated by appropriate fans, meet in a vertical area wherein the air currents are capable of lifting objects in this vertical area. the lifting effect may be seen on the outside of the wind tunnel as the tunnel is built from translucent materials. The viewing and lifting of bodies in the vertical section of the tunnel allows both their display and for measurements to be taken of the bodies.

6 Claims, 6 Drawing Sheets

VERTICAL WIND TUNNEL WITH VIEWING FACILITY

FIELD OF THE INVENTION

This Invention patent application is as indicated in the title "VERTICAL WIND TUNNEL WITH VIEWING FACILITY", the new construction, shape and design features of which fulfil the purpose for which it has been specifically built with maximum safety and effectiveness.

SUMMARY OF THE INVENTION

More specifically the invention refers to a wind tunnel designed to operate in its vertical section that is to say, air currents generated by appropriate means meeting in a vertical area at the end of which the air current is capable of lifting objects in this vertical area. At the same time this lifting effect may be seen on the outside as it has been built from translucent materials. The viewing and lifting of bodies in this conduit allows both their display and measurements to be taken. The invention is a development in the Status of the Technique due to:

Optimising the geometry of the tunnel.
The form of construction of the tunnel.
The location of the air propellers in the tunnel.

Another aim of the invention is to allow this tunnel to be installed for leisure purposes so that the general public may enjoy bodies or people in the vertical section being lifted to check how things are lifted and to experience new sensations.

Another advantage of the invention is the geometric and spatial design of the different sections of the tunnel firstly in order to achieve maximum performance with minimum propeller consumption generating air currents and secondly the operating methods of these propellers being located outside the pipes. This means that they do not interfere with the air currents generated by these propellers avoiding load losses interfering with these air currents. These losses in turn generate turbulence and increased consumption by the electric motors driving the propellers. The power required for the wind tunnel to operate is also dependant on its design. It is not possible to separate the two as optimising the shape will in the end help to decrease this power with the same flow and air pressure.

The stated invention is formed by three conduits in the form of a loop joined at their end by a vertical section; This vertical section is preferably formed by translucent sections. In turn the loops are formed by different conduit sections held together by the corresponding clamps such as screws and similar. Three of these sections include a propeller which is operated from the outside by the corresponding electric motor with its axle connected to the propeller's axle using belts, chains, reducers or equivalent techniques.

The resulting model of tunnel is fundamentally built with the following sections:

Flight chamber, which is the vertical wind section of the tunnel in which its users are placed and the location where the current reaches its maximum speed.

Three return circuits including a series of straight sections which conduct the current from the flight chamber outlet up to the inlet to the corresponding pipe or contraction with the minimum possible losses.

Three contraction pipes, sections from the flight chamber and in which the air current accelerates to enter the chamber at maximum speed.

The technical design of the tunnel is directed at assisting air currents generated by the propellers and their motors to converge in one area; the lower area of the pipe joint so that the sum of the air flows and pressures generated by these currents are added together in the lower section of the joint of these conduits become an ascending current of air which is capable of lifting bodies in this vertical area and allowing their movement inside.

The experiments undertaken and calculations made allow the stated tunnel to operate in two possible ways depending on the type of user using the same:

Expert mode in which the air speed reaches 70 m/s in the flight chamber inlet and will reach the 50 m/s at approximately 6 m above ground level. This allows the user located in a horizontal position to be held constant at this height and in a vertical position when the speed is 65 m/s Non expert mode in which the maximum speed reaches 55 m/s in the flight chamber inlet and 50 m/s at a height of 1.50 m above ground level.

The optimisation of the tunnel is by computer simulation of its aerodynamic behaviour. This has been simulated with finite element software and has allowed the individualised design of each part of the tunnel. Different configurations have been studied for each section, checking the effect of the same on the air flow inside in order to reduce turbulence and to avoid eddies, particularly in the most curved sections of the design. The results of this optimisation is to reduce power consumption by the propellers required top operate the tunnel, a crucial parameter guaranteeing the viability of the larger installations as in this design.

BRIEF DESCRIPTION OF THE RELATED ART

Different type and configurations of tunnel exist on the market and therefore these have to be considered including those with testing chambers in a vertical position. Nevertheless is not possible to directly observe what happens inside and so these have to be equipped with artificial vision equipment to show externally what happens in the vertical section. This is usually used for all forms of experiments, for example the European Patent 96919369.6 for Sky Venture, Inc describing and claiming a "Parachute Jump Simulator", which includes a vertical chamber with a column of air capable of supporting a parachutist in flight equipped with a video projection screen and other elements on one of its vertical walls.

The British patent GB No. 2.094.162 for the company Airflite Inc demonstrates a Levitationarium based on a complex structure to float human beings. The inside of this structure is a chamber in which there is an upward air flow formed by linear air conduits and a grille allowing a person to by inside including a take off area and another landing area with a peripheral conduit in which people are outside the air flow.

Finally and also forming part of the Status of the Technique is demonstrated in Patent PCT WO 2004/022427 by "Free Fall Flight Simulator", which includes a compression chamber on the lower section with terminals for several ventilators laid out in a centripod configuration emerging into a central pipe.

BRIEF DESCRIPTION OF THE DRAWINGS

Other details and characteristics shall be shown throughout the description below referring to drawings attached to this report which are to be representative the preferred details of the invention and are intended to be illustrative but not limiting to the same.

A detailed list of the main parts shown in the attached drawings is given below; (10) tunnel, (11) curved section conduit, (12) platform, (13) impulse conduit, (14) exhaust conduit, (15) clamps, (16) screws, (17) electric motor, (18) reducer, (19) lower conduit joint piece, (20) upper conduit joint section, (21) braces, (22) translucent panels, (23) vertical section of the tunnel (10), (24) ventilators, (25) s, (26) corners, (27) output section.

Figure 1:
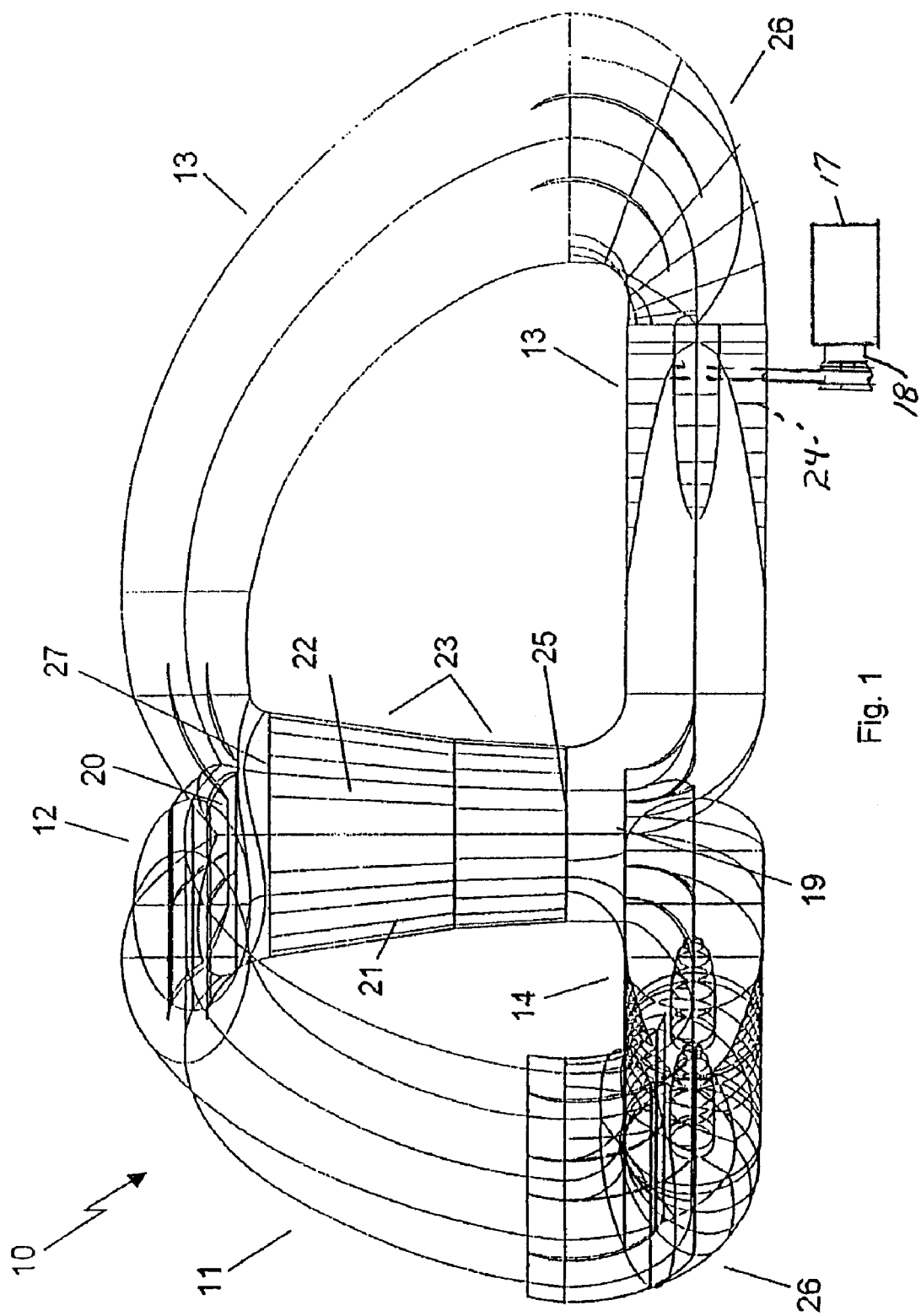
Figure 2:
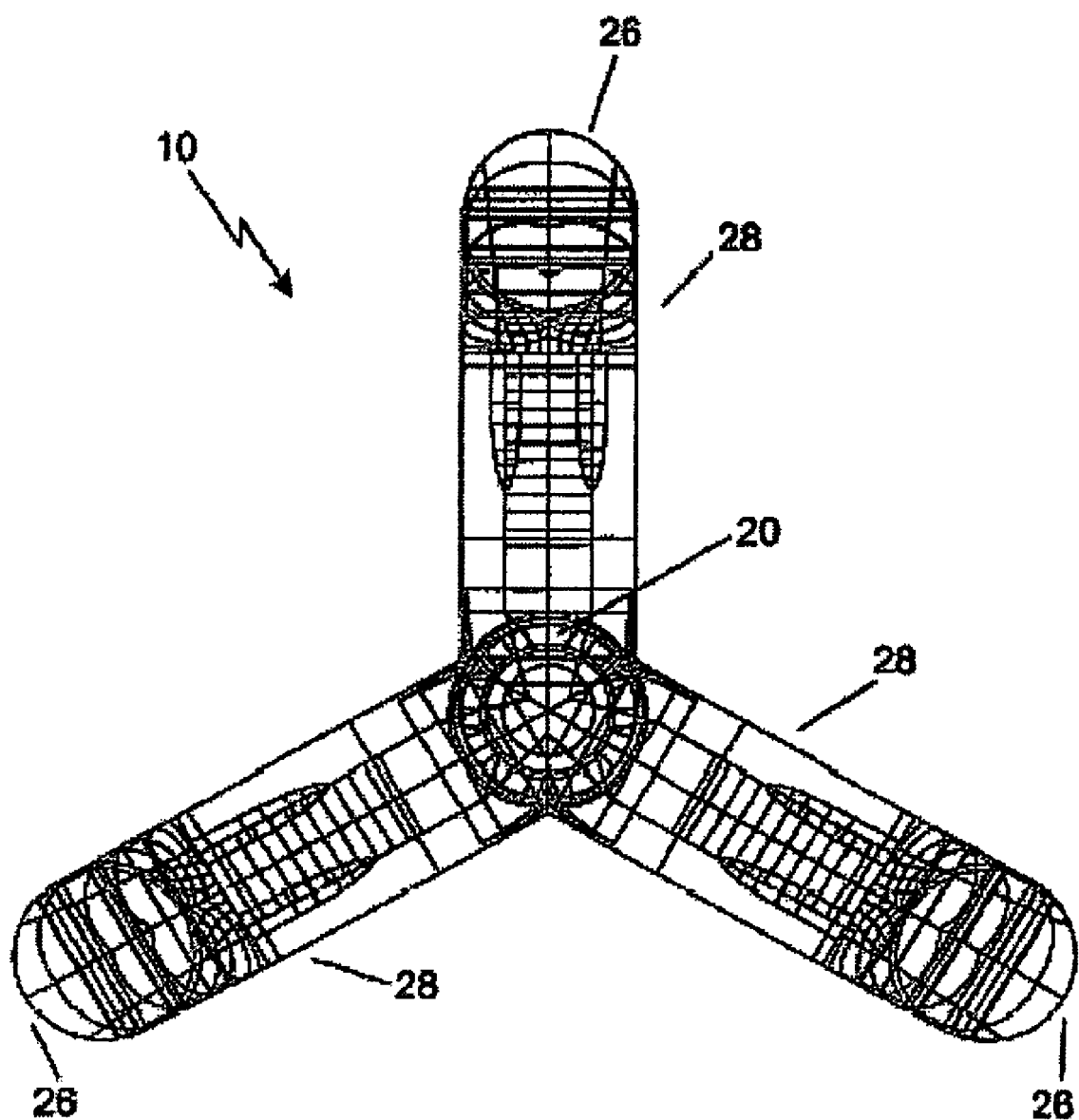

FIG. No. 1 is a perspective view of the tunnel (10) and its conduits (11), (13), (14) and upper joint areas (20) and lower joint area (19), all forming loops.

FIG. No. 2 is an upper view of the tunnel (10) showing the radial layout of the conduits (11), (13) and (14).

FIG. No. 3 is a perspective view of one of the arms or conduits (11), (13) or (14) with ⅓ of the vertical section (23) of the tunnel (10).

FIG. No. 4 is a front view of the conduit loop (20) in the wind tunnel (10).

FIG. No. 5 is an actual scale computer generated image of the installation.

FIG. No. 6 is a representation of the vertical speed valves obtained during computer simulation at ground level in the flight chamber.

DESCRIPTION OF THE PREFERRED EMBODIMENTS

Figure 3:
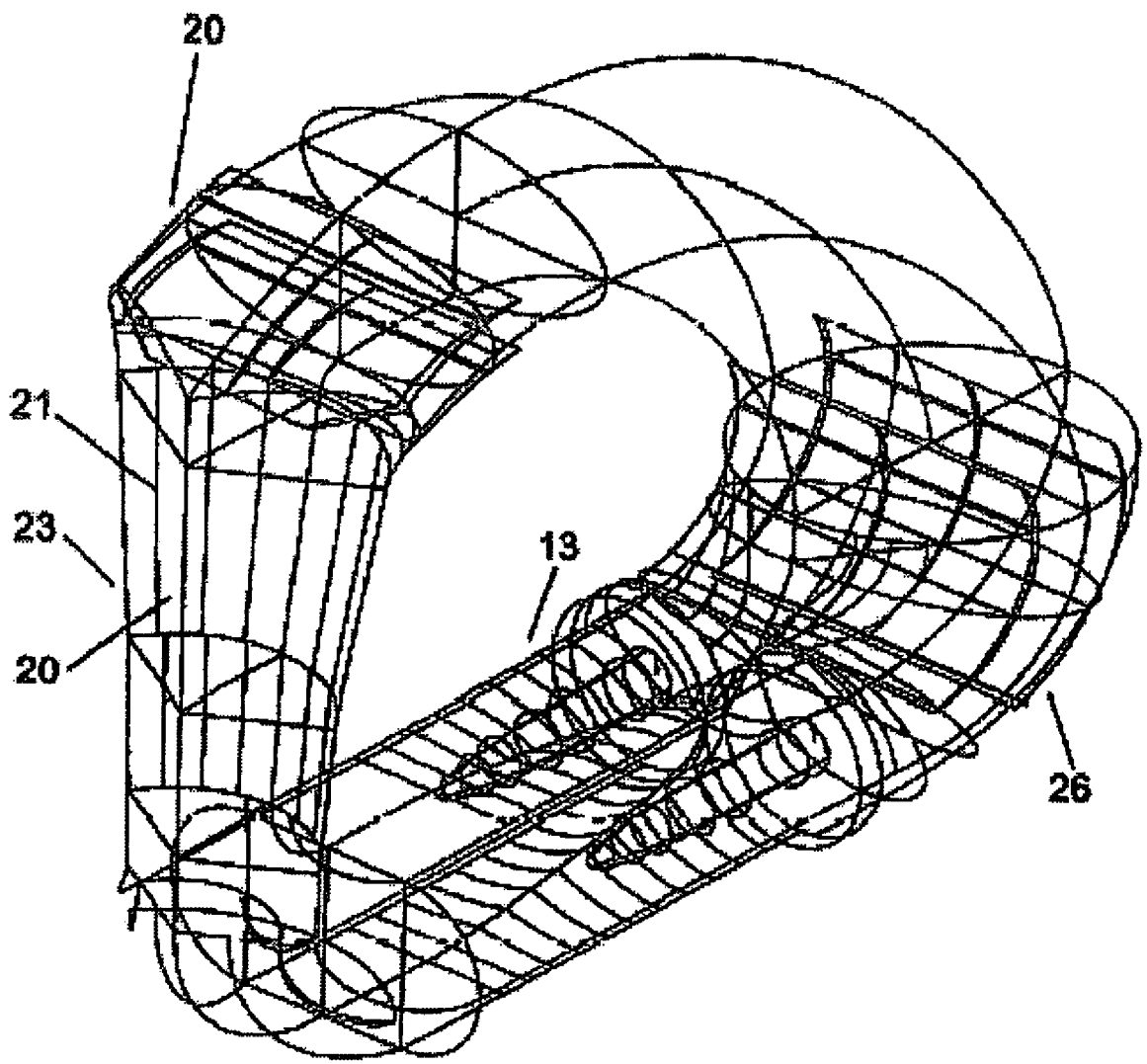
Figure 4:
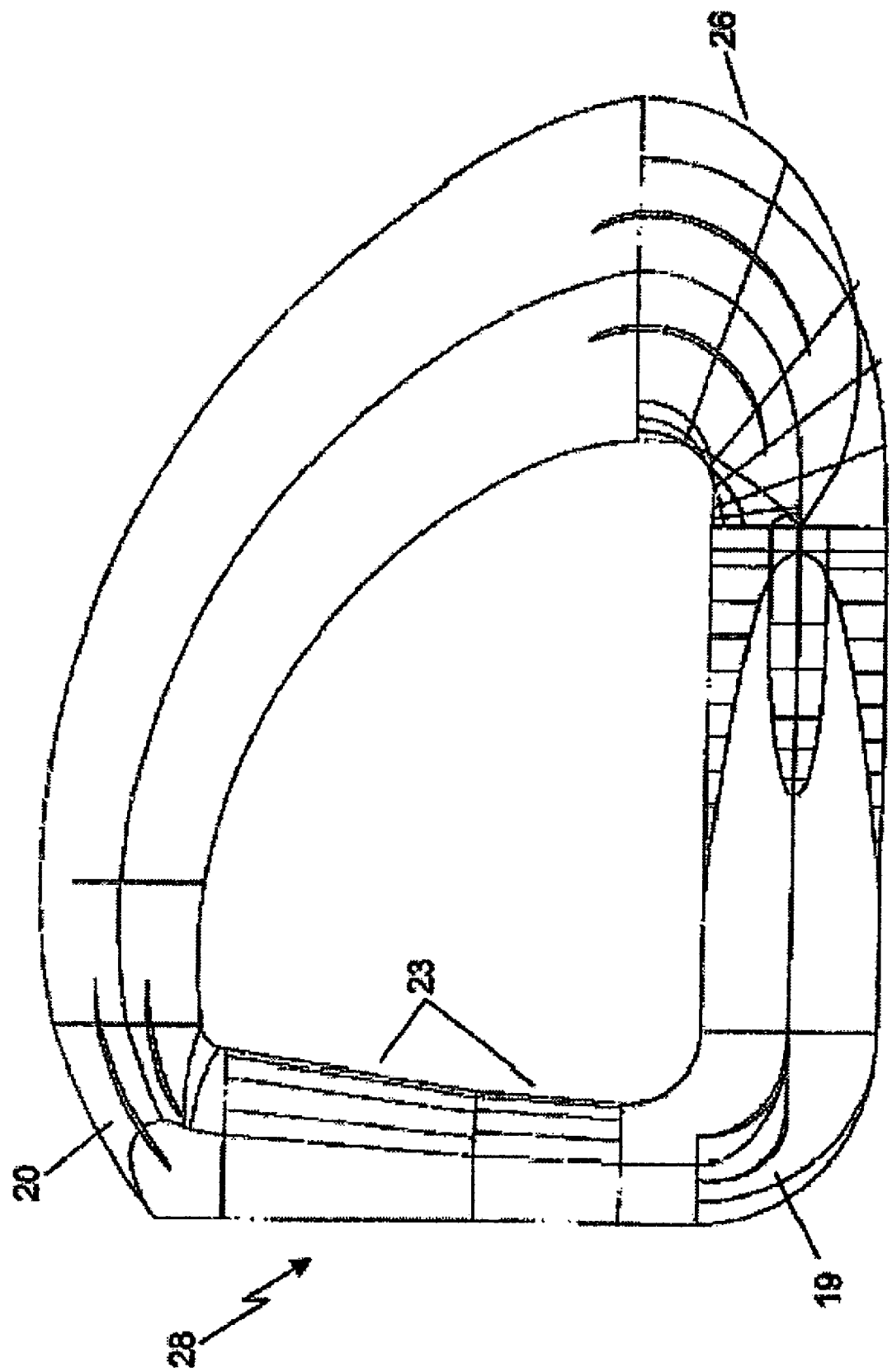

In one of the preferred set ups in this application as shown in FIG. No. 1 (mock up to a scale of 1:12.5) the tunnel (10) is formed by joining and assembling different pipes together to form loops (28), with these loops separated radially at approximately 120°. The angular conduits (11) are assembled o that the upper end is held by appropriate joining parts (20) in the shape of a star, whereas the lower ends (11) are joined to cylindrical drive conduits (13), inside which are drives formed by an electric motor (17) dynamically connected to the relevant fan blades (24), not shown in the figures, via a reducer (18) and pulleys or chains joining the reducer axle with the said fan axle, in turn assembled to the lower end of the conduits (13), drive conduits (14), also not shown in the figures joining in a star shaped joint (19). The design also includes different internal baffles in the pipes, not shown in the figures, located on the upper and lower sections of the flight area, specifically on the star shaped joints (19) and (20), and on the end angles of the return conduits (11), with a dual flow. On the one hand, this avoids turbulence generated at these points by changing the direction of air movement. On the other hand, the baffle located under the vertical section of the tunnel can change the distribution of the air speed in the flight area designed so that upward speed is increased near to the walls in the flight area; This means that the holding force is greater near to the walls in the central section of the flight area so that if the user unknowingly moves towards the walls of the flight area due to being inexperienced in free fall flight, the speed gradient produced by this increase in speed towards the walls will move that person back to the central area of the tunnel, thereby reducing the possibility of hitting the wall. This effect is shown in FIG. 3.

The upper part of the tunnel (10) together with the lower section and more specifically the area (20), with the area (19) are joined by braces (21) housing the translucent panels (22), which join the air inlet section (25) to the vertical section (23) with the outlet section (27), delineating the vertical section (23) in the tunnel (10). This vertical section has a specific shape formed by two different conical generating trunks. On the lower part of the vertical section on an actual scale set up (between 0 and 3 m high) the cone increases in diameter from 5 to 5.4 m, with the walls forming an angle of 3.81° form the vertical, whereas on the upper section (between 3 and 8 meters high) the diameter increases from 5.4 to 7 m, forming walls at an angle of 9.09°. This change in the divergence of the vertical section of the tunnel changes the vertical distribution of air speeds to achieve a variation between 70 and 50 m/s in expert mode at a reasonable height. If not the installation would have to considerably increase its total height with the consequent construction and operational cost increases as the internal air corridor is increased to increase the drive power required to maintain a stable flow.

Figure 5:
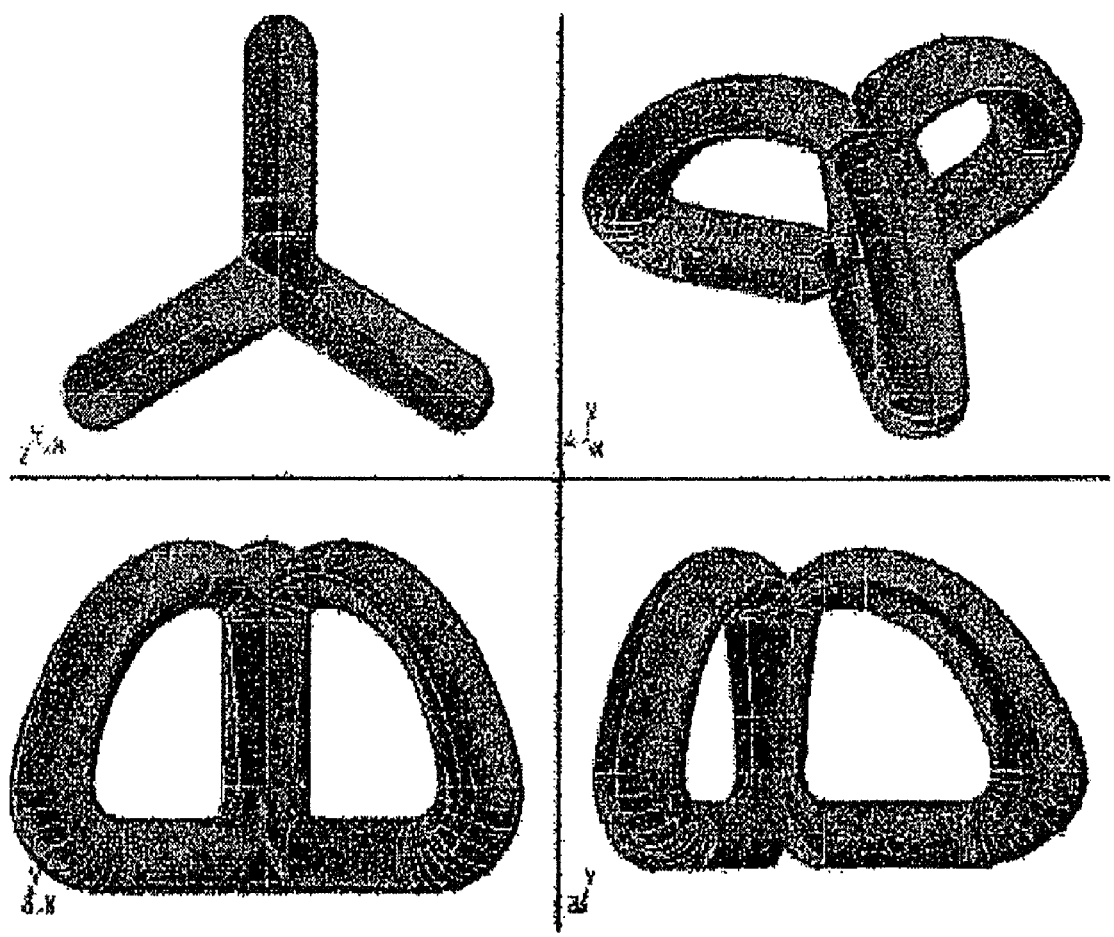

The tunnel (10) has a geometry referred to in FIG. 5 characterised by the following aspects:

The shape of the transverse section of the circuit is circular in the vertical section of the tunnel, oval in the upper section, circular in the lower section and 120° circular in the opening of the joint section (19).

The inlet section (25) in the flight chamber or vertical section (23) is at ground level, that is to say at 0 m and is formed by two conical trunks with a different divergence with the greater divergence in the upper cone than the lower cone.

The curved sections (11) or corners in the return circuit (26) are at approximately 135° angles.

The return circuit varies its transverse section throughout the length of its run.

Figure 6:
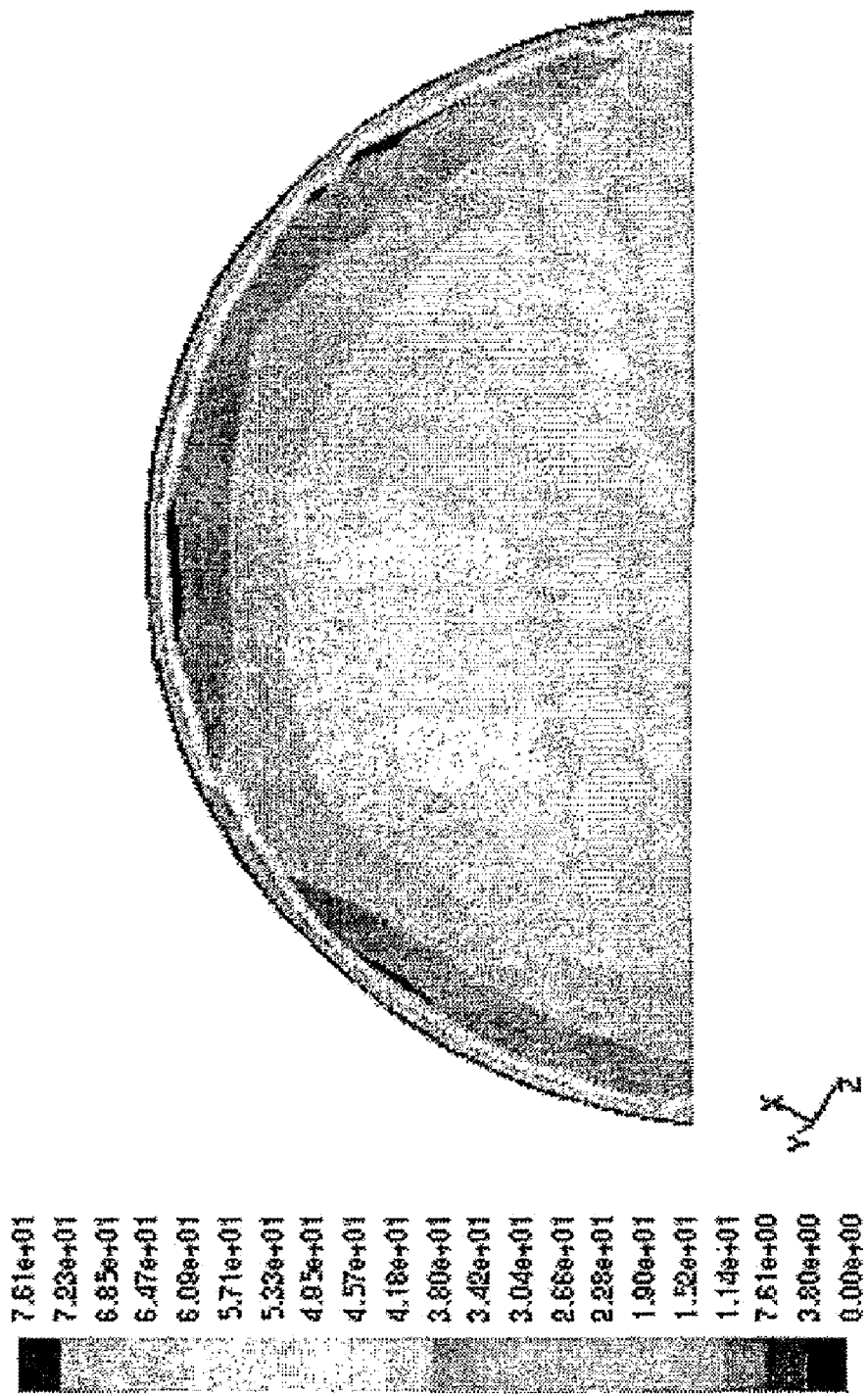

Dynamics in the tunnel (10) referred to in FIG. 6, run from the electric motors (17) operating the fans (24) located inside the conduits (13), which drive the air inside (10), creating a pressurised air current to the lower joint section (19), in which the sum of the air flows from the conduits (11) driven by the combined action of (17 and 24), sends air to the vertical section (23), which, due to the translucent panels (22) allow the inside to be seen (23) and the objects or people inside without the need for artificial viewing devices. This allows these panels to be converted into a practical door facilitating the entry or exit of the aforementioned objects.

The conduit joint (11), (13), (14), and areas (19 and 20) run along clamps (15) and screws (16) with their corresponding nuts, not shown in the attached figures, interspersed with compression joints where necessary, resulting in a high performance closed circuit with reduced energy consumption.

Calculating energy consumption for the actual scale installation, in which the inlet to the flight area diameter is 5 m, has been made from digital simulations; Table 2 shows some of the most significant results. As a comparison, consumption is shown for an open tunnel (without return) in which the air is taken directly from the exterior, driven vertically towards the flight area and then released into the atmosphere as for example in European Patent No. 96919369.6 for the aforementioned Sky Venture, Inc.

TABLE 3

Calculating operational power for a 5 m diameter wind tunnel.

| Model of Tunnel | Consumption | |
|---|---|---|
| | Non expert mode (v = 50 m/s) | Expert mode (v = 70 m/s) |
| Open tunnel (without return) | 1.45 MW | 3.98 MW |
| 3 arm tunnel with baffles in (20) and (11) | 1.18 MW | 3.17 MW |
| 3 arm tunnel with baffles in (20), (11) and (19) (worse result) | 1.43 MW | 3.83 MW |
| 3 arm tunnel with baffles in (20), (11) and (19) optimised | 0.60 MW | 1.72 MW |

Analysing the data in the aforementioned table 3 it can be seen that the behaviour of the tunnel (10) is difficult to predict without the assistance of digital simulation. However, a design which is the purpose of the invention allows a saving of over 50% of the power required to operate an open tunnel.

Another essentially important aspect of this type of installation is that the simulations must be carried out on an actual scale for the installation given that the laws on aerodynamics are not linear and the behaviour of the installation can vary as the size changes, even though the shape of the conduits does not change. The fundamental effect of this change can be seen in the power consumed which changes specifically as the size of the installation changes.

A feature common to all closed wind tunnels (where air is recirculated to save drive power) is that the effect of the air rubbing against the walls causes the air to heat up which is not suitable for the continuous operation of the tunnel. Whereas in a mock up this effect may pass unnoticed, in the actual size installation it cannot be ignored given that a very considerable amount of power is supplied to the air during the drive process and the air temperature variation is very significant, particularly when the external air temperature is high. The air heating up causes its density to fall; in the installation shown this would mean that as a consequence the force holding up the user would fall in addition to the inconvenience caused by the increased temperature. In order to avoid these undesirable effects in the installation, the curved conduits (11) have been built using a good heat conducting material such as aluminium with a cooling jacket built around it to circulate cold water from an external cooling device. Also, the baffles inside sections (20), (11) and (19) will be made out of aluminium or a similar good conductor of heat and holes will be built into this to circulate cold water from the inside acting as additional heat exchangers. Calculations made indicate that under unfavourable conditions (that is to say an external temperature of 30° C.) with the appropriate cooling power, the temperature in the tunnel's vertical section or flight section will vary between 27° C. in non expert mode and 33° C. in expert mode, which are considered to be suitable for the installation's operation.

Having sufficiently described this invention using the attached drawings, it is easy to understand that any changes judged to be suitable may be made, whenever these changes do not alter of the essence of the invention summarised in the following claims.

The invention claimed is:

1. A wind tunnel for using pressurized air flow to suspend objects, the wind tunnel comprising pipes joined together to form loops in a radial layout having radial axes separated from each other by approximately 120°, the loops are formed so as to be combined with one another to create a common vertical air lift section, each loop includes a curved conduit having an upper end communicating with an upper joint connector in a shape of a three point star and a lower curved return end joined to a lower cylindrical air drive conduit, the lower air drive conduits being mounted to converge into a lower three point star shaped joint connector having an upper open end which is mounted to deliver air flow to the vertical section that is connected at an upper end thereof to the upper joint connector, and air flow generators for delivering air through the loops so as to flow upwardly through the vertical section to thereby suspend an object within the vertical section.

2. The vertical wind tunnel according to claim 1, wherein the air flow generators include fans mounted within the loops, and drive means exterior of the loops for powering the fans.

3. The vertical wind tunnel according to claim 2, wherein the external drive means for each of the fans includes an electric motor and a reducer connected by chains or pulleys to a drive shaft of a fan.

4. The vertical wind tunnel according to claim 1, wherein
a transverse section taken through the vertical section is circular, the upper end of the curved section is oval in cross section, the lower cylindrical are drive conduits are circular in cross section; and 120° semi-circular in the upper open end of the lower joint connector;
the vertical section is formed by lower and upper conical trunks with the upper conical trunk having a greater divergence in diameter extending from a lower portion thereof to an upper portion thereof than a divergence of the lower cone from a lower portion thereof to an upper portion thereof;
each of the lower curved returns is curved at approximately a 135° angle; and
a transverse section of each lower curved return varies throughout its length.

5. The vertical wind tunnel of claim 1 wherein the vertical section is formed using translucent panels so that an object is viewable from outside the vertical section when positioned within the vertical section.

6. The vertical wind tunnel of claim 1 wherein the vertical section has a lower conical trunk that diverges outwardly at a first angle from a lower portion thereof to an upper portion thereof and an upper conical trunk that diverges outwardly at a second angle greater than the first from a lower portion thereof that engages the upper portion of the lower conical trunk to an upper portion thereof.

* * * * *